United States Patent [19]

Parker

[11] Patent Number: 5,605,142

[45] Date of Patent: *Feb. 25, 1997

[54] PORTABLE BARBEQUE

[75] Inventor: Nicholas S. Parker, Sun Valley, Id.

[73] Assignee: Parker, Inc., Sun Valley, Id.

[ * ] Notice: The term of this patent shall not extend beyond the expiration date of Pat. No. 5,553,601.

[21] Appl. No.: 221,645

[22] Filed: Apr. 4, 1994

[51] Int. Cl.⁶ .................................. F24C 1/16; F24C 3/00
[52] U.S. Cl. .................. 126/9 B; 126/9 R; 126/39 R; 126/304 R
[58] Field of Search ............... 126/9 R, 41 R, 126/304 R, 304 A, 305, 306, 9 B, 40, 39 R; 99/446

[56] References Cited

U.S. PATENT DOCUMENTS

| | | |
|---|---|---|
| 806,475 | 12/1905 | Koneman . |
| 1,885,325 | 11/1932 | Bogley . |
| 1,956,387 | 4/1933 | Hartman . |
| 2,180,868 | 11/1939 | Dunning et al. . |
| 2,928,385 | 5/1960 | Peplin .................. 126/25 |
| 2,985,164 | 5/1961 | Imoto . |
| 3,503,324 | 3/1970 | Gmeiner ................ 99/393 |
| 3,753,431 | 8/1973 | Koziol ................... 126/38 |
| 4,257,388 | 3/1981 | McGuire ................ 126/26 |
| 4,403,597 | 9/1983 | Miller .................... 126/41 |
| 4,703,746 | 11/1987 | Hitch ..................... 126/25 |
| 5,172,682 | 12/1992 | Luebke et al. ......... 126/21 |
| 5,211,105 | 5/1993 | Liu ........................ 99/446 |
| 5,368,009 | 11/1994 | Jones .................. 126/41 R |

FOREIGN PATENT DOCUMENTS

| | | | |
|---|---|---|---|
| 240951 | 1/1960 | Australia ............... 126/41 R |
| 1081637 | 12/1954 | France .................. 126/41 R |
| 217799 | 6/1924 | United Kingdom ... 126/41 R |

*Primary Examiner*—Carl D. Price
*Attorney, Agent, or Firm*—Pearson & Pearson

[57] ABSTRACT

A barbecue adapted for portability and being gas-fired. A parallel smoker plate assembly intermediate a gas burner and a cooking plane enhances heat transfer to provide even cooking heat across the entire cooking area. Each of two parallel plates in the smoker plate assembly have offset aperture patterns that facilitate the transfer of heat while preventing the accumulation of liquids from any food in the combustion chamber. A burner assembly with an open-ended tube receives fuel from a pressurized gas bottle having a regulator and discharge tube that readily connects to a detaches from one end of the barbecue. When detached, the gas bottle, regulator and discharge tube stow readily within the barbecue. Integral, pivotal leg structures lying within the combustion chamber shift between stowed positions where they are positioned interiorly of the exterior surface of a barbecue and supporting positions where they stably support the barbecue on a surface.

16 Claims, 7 Drawing Sheets

PORTABLE BARBEQUE

BACKGROUND OF THE INVENTION

1. Field of the Invention

This invention generally relates to barbecues including both portable and nonportable gas barbecues.

2. Description of Related Art

Gas fired barbecues have become very popular. A gas barbecue generally comprises a housing or cabinet that supports a grill over a combustion chamber. A burner in the combustion chamber attaches to a gas bottle as a fuel source. The popularity of these gas fired barbecues as an alternative to charcoal barbecues stems from ease of use, the elimination of ash disposal and minimal cleaning requirements after each use.

A number of particularly desirable features for charcoal and gas fired barbecues have evolved over the last several years. For example, charcoal barbecues produce relatively even heating over a cooking area by the proper distribution of charcoal briquettes in a combustion chamber. Burners in gas fired barbecues, on the other hand, act as localized heating sources requiring some structure for distributing the heat before it reaches the food being cooked. In both charcoal and gas fired barbecues it also important that the combustion chamber operate reliably in a variety of wind conditions.

Propane is often the fuel of choice for gas fired barbecues. Gas bottles under high pressure usually connect to a regulator that reduces the pressure and controls gas flow to the burner within the barbecue. This connection should facilitate the replacement of gas bottles. In portable barbecues it is important that the regulator and gas bottle be easily detached from the barbecue to facilitate storage within the barbecue. Portable barbecues also require some mechanism for positioning the housing above any supporting surface, particularly a combustible surface or one susceptible to heat damage. Each of these areas has been the subject of prior art development directed to the design of effective barbecues particularly gas-fired, portable barbecues.

For example, the following patents disclose diverse combustion chamber structures that seek to produce even distribution of heat:

| | |
|---|---|
| 806,745 | (1905) Köneman |
| 1,885,325 | (1932) Bogley |
| 2,180,325 | (1939) Dunning et al. |
| 4,403,597 | (1983) Miller |
| 4,703,746 | (1987) Hitch |
| 5,172,682 | (1992) Luebke et al. |
| 5,211,105 | (1993) Liu |

The Köneman patent discloses a grill to be positioned over a heat source. The grill has a perforated flat bottom heat distributing diaphragm, a first corrugated diaphragm spaced above the heat distributing diaphragm and a similar, second corrugated diaphragm above the first corrugated diaphragm. The corrugations in each of the first and second diaphragms align. The corrugation peaks in the first diaphragm and valleys in the second corrugated diaphragms have offset apertures. Heat distributes from the bottom diaphragm through the first and second diaphragms to cook food that the second diaphragm supports. Fat from the food drips through the apertures in the valleys of the second corrugated diaphragm and into the first corrugated diaphragm to be carried away.

In the Bogley patent a broiler plate for use in a fry pan comprises a corrugated-like surface with apertures. The apertures allow heat to reach the food being broiled and allow juices from the food to pass through the plate to the pan.

A griller in the Dunning et al. patent has gas-fired heating elements and two spaced, parallel firebrick slabs. A lower slab and supporting plate have aligned apertures containing burner nozzles. The upper slab has apertures that are offset with respect to the apertures in the lower slab. The slabs are inclined with respect to the horizontal so fat dripping from material being cooked is collected in a drip sill.

The Miller patent discloses a heat transfer device in the form of a solid cast iron plate with an irregular top surface resembling a lava bed and a plurality of holes permitting the passage of fats and juices from any food being cooked. The areas around the openings are inclined toward the openings to promote the flow from food juice droplets through the openings.

In the Hitch patent an adjustable shutter grate for a barbecue comprises two parallel, stacked structures for controlling flare ups. Each structure has apertures, and the structures are slidable between two positions relative to each other. In one position the apertures align to provide a direct path from food being cooked on top of the structure to the heat source. In the other extreme position the apertures are completely blocked.

The Luebke et al. patent discloses a commercial convection cooker that includes a plurality of spaced plates with offset apertures. These apertures provide offset air passages for facilitating cooking.

In the Liu patent a smokeless and scorchless grill pan includes an upper food plate and an oil pan placed under the food plate. A fire heats the oil pan and the air in a hollow space between the oil pan and the food plate. The oil pan is corrugated with a plurality of apertures for passing heated air and two opposite recesses near a circumferential edge. The food plate is also corrugated and has a plurality of oil holes for allowing oil exiting the food to drop onto the oil pan and then to the opposite recesses of the oil pan.

Although each of the foregoing references disclose structures that distribute heat in cooking devices, only the Köneman, Bogley, Miller, Hitch and Luebke patents are applicable to barbecues. The Köneman and Dunning et al. patents disclose structures in which the support surface for food being cooked is slanted. The Köneman, Bogley, Hitch, Luebke and Liu patents disclose structures in which an upper corrugated plate supports the food directly. The Miller patent discloses a single plate as a heat transfer distributor, but designs the plate so that a portion of any juices exuded from the food will pass into a combustion chamber. The Köneman patent requires water that is converted to steam. None of these references describe a structure for distributing heat in a way that minimizes the transfer of juices into a combustion chamber and yet provides a method for producing smoke from those juices that flavors the food being cooked.

Portable barbecues should be constructed with legs that position the barbecue in a stable manner above any supporting surface and that readily stow for transport. The following patents disclose various leg structures for positioning portable barbecues above support surfaces:

| | |
|---|---|
| 2,928,385 | (1960) Peplin |
| 2,985,164 | (1961) Imoto |
| 3,503,324 | (1970) Gmeiner |
| 3,753,431 | (1973) Koziol |
| 4,257,388 | (1981) McGuire |

The Peplin patent discloses a portable grill with a fire basket and two leg members. The leg members detachably fasten to the fire basket.

In the Imoto patent a collapsible camp stove has detachable legs. The legs move from a storage position to be supported in exterior clips on the side portions of the stove.

The Gmeiner patent discloses a collapsible charcoal grill. Supporting leg portions located in a bottom exterior recess thereof are disposed on hinges and pivot around a lower lateral wall edge.

In the Koziol patent a portable grill includes a detachable propane cylinder. When it is desired to use the grill for cooking, a support frame is removed from the grill and foot members are extended along with a hook for supporting the propane cylinder.

A foldable barbecue grill disclosed in the McGuire patent includes pivoted legs at each corner of a barbecue frame. Spring clips adjacent each leg retain the legs in a storage position. Other clips formed on the frame limit the rotation of the legs to a supporting position where the legs splay outwardly.

Although each of these references discloses various leg structures used for supporting a portable grill, the Imoto, Peplin and Koziol patents disclose leg structures that must be detached from the portable barbecue to moved from a storage position to a supporting position. The Gmeiner and McGuire patents disclose leg structures that are formed integrally with a portable barbecue, but are mounted entirely exteriorly of the barbecue. None of these patents disclose legs that are located interiorly of the barbecue for storage and pivot outwardly to support the barbecue in a stable manner.

SUMMARY

Therefore it is an object of this invention to provide a barbecue with improved features.

Another object of this invention is to provide an improved portable barbecue in which all components store interiorly of the barbecue for transport.

Still another object of this invention is to provide a portable barbecue that is easy to erect for use and dismantle for transport.

Yet another object of this invention is to provide a gas-fired barbecue that distributes heat evenly over a cooking area.

Yet another object of this invention is to provide a portable gas-fired barbecue that operates reliably in windy conditions.

In this invention a barbecue grill having a base for a forming a combustion chamber has a floor and supports for spanning the combustion chamber that carry food in a support plane. First and second spaced perforated plates are located intermediate the combustion chamber with a pattern of perforations in one of the plates being offset from a pattern of perforations of the other plates. Heated air flows from the combustion chamber through the perforations to heat the plate means and any food on the support.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
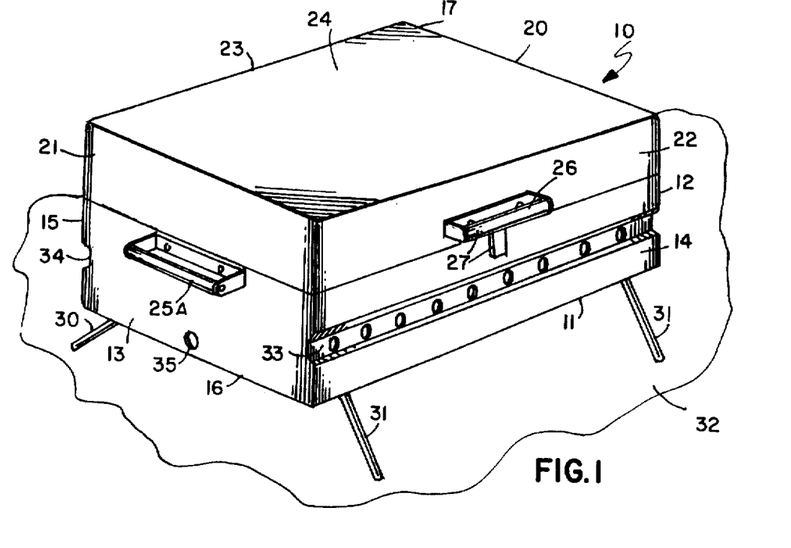
FIG. 1 is a perspective view of a portable barbecue constructed in accordance with this invention.

FIG. 1 depicts a portable barbecue 10 with a base 11 formed by first and second walls defining parallel end walls 12 and 13 and third and fourth walls defining front and back walls 14 and 15. Each of the walls 12 through 15 extends vertically with respect to a bottom plate 16 thereby to form a combustion chamber.

A cover 17 closes over the base 11 and includes first and second walls acting as parallel end walls 20 and 21. Third and fourth walls constitute front and back walls 22 and 23. A top 24 spans the walls 20 through 23 thereby to form the cover 17 that closes on the base 11. A side handle 25A mounted on end wall 13 and a corresponding side handle 25B, not shown in FIG. 1, mounted to end wall 12, enable an individual to carry the portable grill 10 in substantially the orientation shown in FIG. 1. A front handle 26 allows an individual to carry the portable grill 10 in a substantially vertical orientation, like a valise, when a latch 27 locks the cover 17 and the base 11 together.

In FIG. 1 splayed legs 30 and 31 extend from the bottom 16 of the base 11 and position the barbecue 10 above a support surface 32, such as the ground. The front wall 14 and back wall 15 have perforated indentations 33 and 34 extending along the length of the walls 14 and 15 parallel to the bottom 16. The perforations in the indentations 33 and 34 constitute combustion air access ports. An aperture 35 located proximate the base 16 through the end wall 13 constitutes an ignition access port. The operation and function of these ports will be described more fully hereinafter. The indentations 33 and 34 minimize the possibility of rainwater entering the combustion chamber. As water flows down the surfaces, like surfaces 22 and 14, it tends to drop across the indentations 33 and 34, rather than flow through the air access ports into the combustion chamber.

Figure 2:
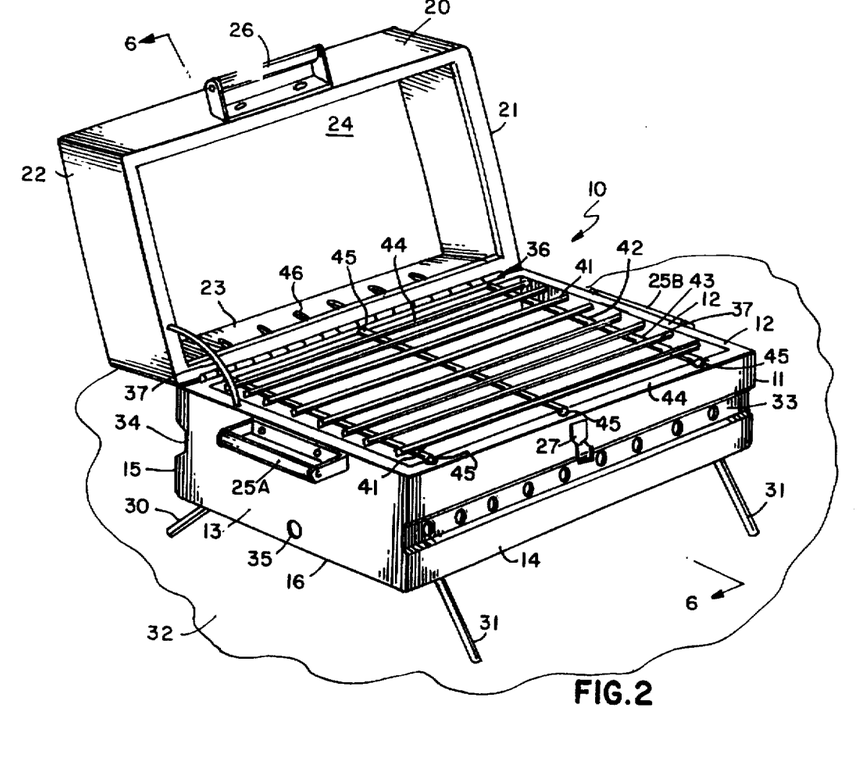
FIG. 2 is another perspective view of the barbecue shown in FIG. 1.

When an individual releases the latch 27 and lifts the handle 26, the cover 17 pivots about a hinge 36 at the juncture of the back walls 15 and 23 as shown in FIG. 2. A stop 37 limits the pivotal motion of the cover 17 and establishes a "ready-for-use" position. In this position, the cover 17 is in a stable open position and the entire barbecue 10 is stable on its legs 30 and 31.

A grill 40 comprises closely spaced rods 41 that run parallel to the walls 14 and 15 and widely spaced rods 42 that run parallel to end walls 12 and 13. The rods 41 and 42 form a grid and are welded together. Inwardly and oppositely extending shelves 43 on the side walls 12 and 13 respectively support the ends of the rods 41. In this particular embodiment the rods 41 are positioned over the rods 42. Shelves 44 formed in the front and back walls 14 and 15 in the same plane as the shelf 43. However, the shelves 44 include recesses 45 positioned to receive the ends of each of the rods 42. Consequently the shelves 43 and 44 firmly support the grill 40 so the grill 40 can position food in a support plane generally parallel to the floor 16.

As shown in FIG. 2, the back wall 23 of the cover 17 has a plurality of apertures or vents 46. These vents 46 allow smoke to escape from the barbecue 10 when food is cooked with the cover 17 closed.

Figure 3:
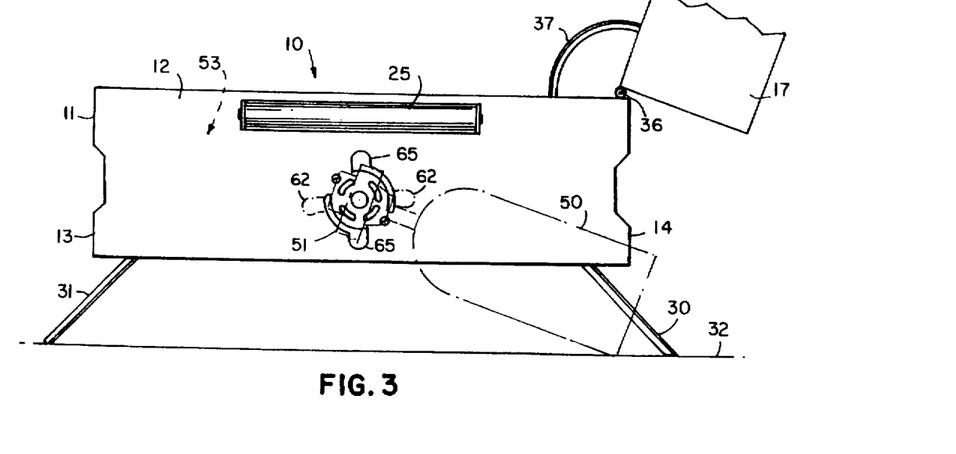
FIG. 3 is a side view of the barbecue shown in FIG. 2.
Figure 4:
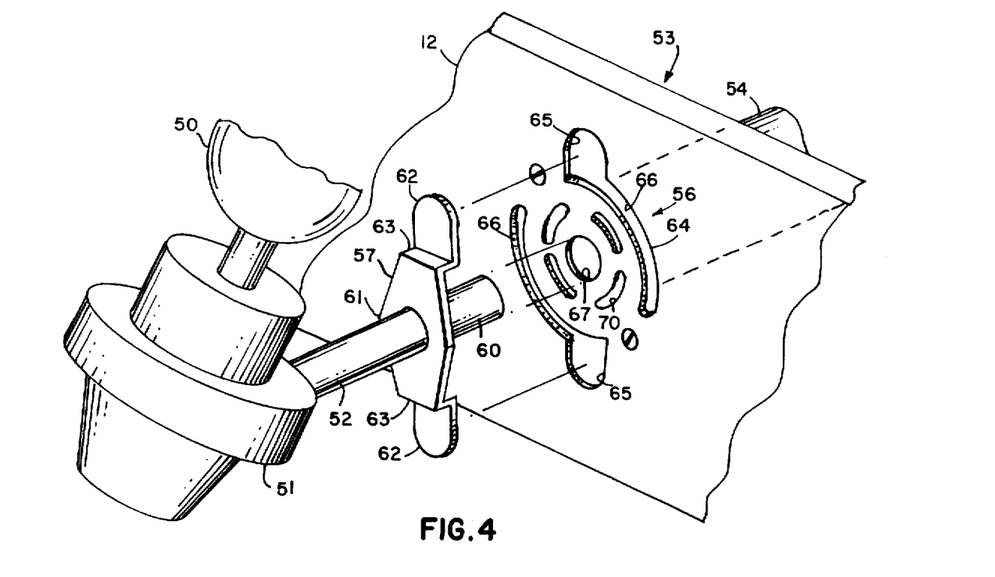
FIG. 4 is an exploded view of a portion of the barbecue shown in FIG. 3.
Figure 5:
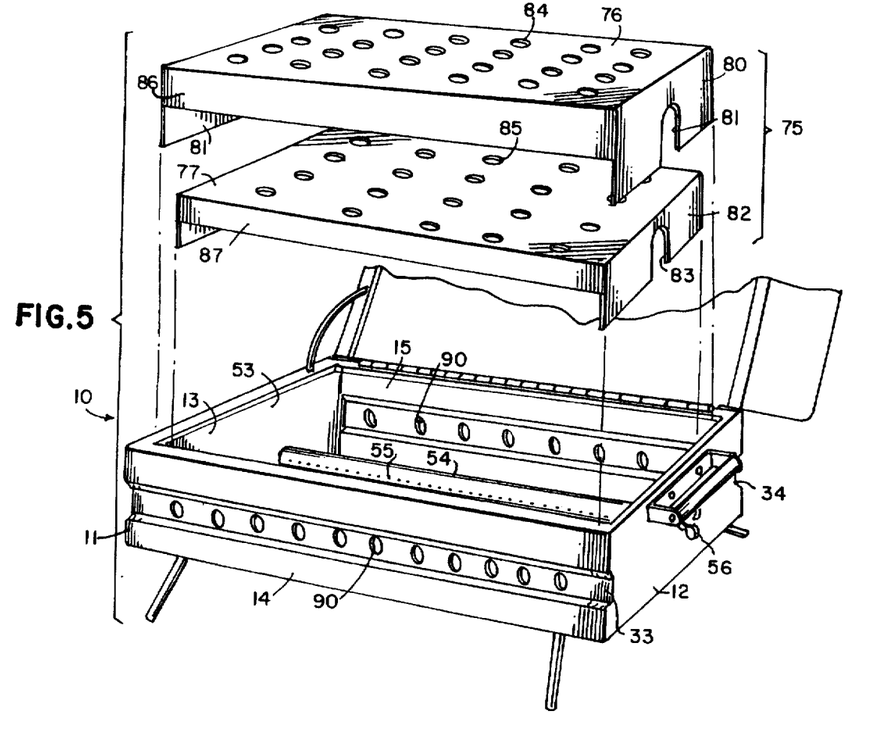
FIG. 5 is another exploded view of portions of the barbecue shown in FIG. 2 including one embodiment of a smoker plate assembly with a pattern of spaced perforations.

The barbecue 10, in its preferred embodiment, is gas-fired. As shown in FIGS. 3 through 5 a pressurized supply or bottle 50 of propane or other gas fuel provides the heating. A conventional pressure regulator 51 attaches to the pressurized bottle 50 and supplies gas at a regulated rate through a discharge tube 52. As more clearly shown in FIGS. 4 and 5, the discharge tube 52 extends into a combustion chamber 53 surrounding a burner tube 54 with a plurality of gas ports 55. When the regulator 51 is adjusted to admit gas into the burner tube 54, the gas can be ignited by placing a match or other ignition source through the ignition port 35 shown in FIGS. 1 and 3.

FIGS. 2 through 5 depict a particular structure for enabling the ready connection and disconnection of the gas supply including the pressurized bottle 50 from the end wall 12 of the portable grill 10. As best shown in FIG. 4, the connection includes a set of apertures 56 formed in the end wall about a common axis and a connecting arm 57 attached proximate a free end 60 of the discharge tube 52.

The connecting arm 57 extends radially from the discharge tube 52 and terminates with end tabs 62. The end tabs 62 are slightly skewed with respect to the plane of the arm 61 and offset by portions 63. The offset corresponds substantially to the thickness of the end wall 12.

The aperture set 54 includes a first set of apertures 64 formed in an outer annulus. The apertures in the first set 64 comprise diametrically opposed recesses 65 through the end wall 12 and an annular slot 66 extending from the recesses 65. A central aperture 67 receives the gas spud or free end 60 of the discharge tube 52. A set of arcuate slots or apertures 70 intermediate the annular slots 66 and central aperture 67 constitute primary air slots for allowing the passage of air into the burner tube 54 for producing the appropriate air-propane or other air-gas mixture required for combustion.

In use, an individual positions the assembled the pressurized bottle 50, regulator 51 and discharge tube 52 so the end tabs 62 align with the recesses 65. As the end tabs 62 pass through the recesses 65, the gas spud 60 centers in end of the burner tube 54. Once the connector 57 is fully seated through the recesses 65, the individual rotates the entire assembly about the discharge tube 52 in a clockwise direction as shown in FIG. 3. This rotation displaces the end tabs 62 into the annular slots 66 to the position shown in FIG. 3 when the pressurized gas bottle 50 abuts the supporting surface 32. The resulting friction between the end wall 12 and the end tabs 62 provides a positive connection.

When the pressurized bottle 50, regulator 51 and discharge tube 52 are mounted as shown in FIG. 3, operating the regulator 51 initiates gas flow through the discharge tube 52 and into the burner tube 54. The outer diameter of discharge tube 52 is smaller than the inner diameter of the burner tube 54. As the gas leaves the discharge tube 52, it produces an area of low pressure that causes air to flow through the apertures 70 past the discharge tube 52 into the burner tube 54. This air provides the appropriate air-gas mixture for enabling sustained combustion at the gas ports 55. Moreover, the mixing operation occurs within the confines of the combustion chamber 53.

After use, an individual merely rotates the gas bottle 50, regulator 51 and discharge tube 52 back until the end tabs 62 align with the recesses 65 whereupon the gas bottle, regulator and discharge tube can be withdrawn as a unit for storage. In this configuration, inadvertent operation of the regulator 51 could produce gas flow from the discharge tube 52. However, the gas would not be aspirated and would not support sustained combustion.

Figure 6:
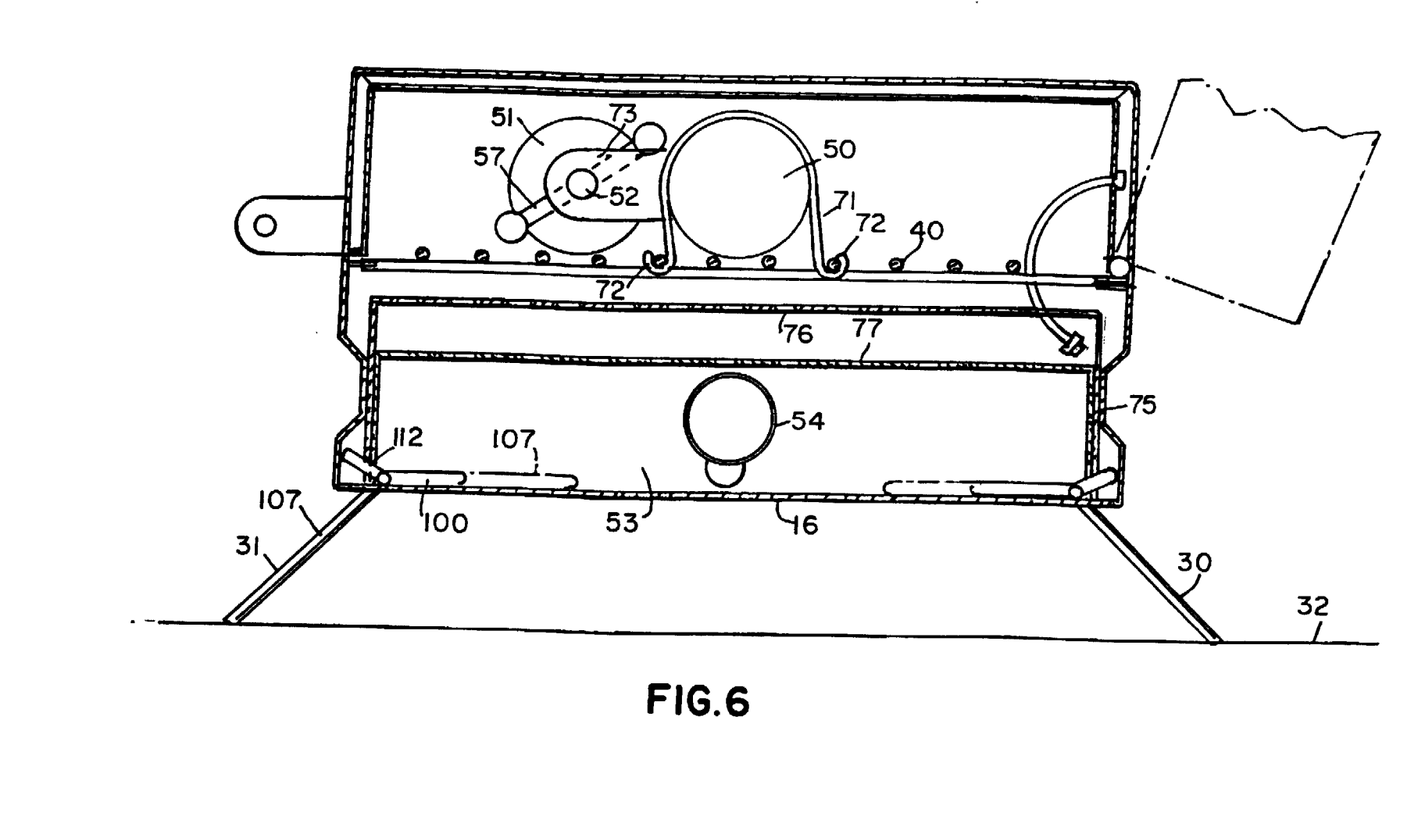
FIG. 6 is an end sectional view of the barbecue taken along lines 6—6 in FIG. 2.

FIG. 6 depicts one embodiment of an apparatus that stows the gas bottle 50, regulator 51 and discharge tube 52 with its connector 57 on the grill 40. Specifically, a u-shaped clip 71 encompasses the gas bottle 50 and has return portions 72 at its free ends that clip onto the grill 40. An integral tab 73 extending from the clips 71 captures the regulator 51 and discharge tube 53 after they are removed from the gas bottle 50. This structure assures that during transport the gas bottle 50 is separated from the regulator 51. When separated, the gas bottle 50 is self-sealing so gas can not escape from the bottle 50.

When gas emanating from the burner tube 54 ignites, it burns along essentially two lines between the end walls 12 and 13. FIGS. 5 and 6 depict one embodiment of a smoker plate assembly 75 for distributing that heat over the entire area of the combustion chamber 53 for evenly heating food on the grill 40. This smoker plate assembly 75 includes an upper plate 76 and a lower plate 77. As shown particularly in FIG. 6, the upper plate 76 and lower plate 77 are spaced with respect to each other and are intermediate the burner tube 54 and the grill 40. The upper plate 76 includes depending end portions 80 having a central recess 81 that constitute standoffs for engaging the floor 16 thereby to position the upper plate 76 in the combustion chamber 53. Corresponding depending end walls 82 and recess 83 constitute standoffs of the lower plate 77 that also engage the floor 16. Thus the end portions 80 and 82 position the upper and lower plates 76 and 77 intermediate the burner 54 and the grill 40 and space the two plates with respect to each other. If the plates are steel, the heating tends to raise the temperature of each of the plates evenly across the area of the upper and lower plates 76 and 77 thereby to produce more even heating across the entire area of the grill 40.

FIGS. 5 and 6 also disclose an air baffle feature that the smoker plate assembly 75 can provide. Specifically the upper plate 76 includes depending portions 86 between the end portions 80, and the smoker plate 77 includes depending portions 87 between the end portions 82. These depending portions 86 and 87 overlie combustion air access ports 90 formed in the front and rear sections 33 and 34. Air entering the combustion chamber 53 passes through the ports 90 and around the depending portions 86 and 87 before entering the combustion chamber 53. The depending portions 86 and 87 therefore constitute an air flow baffle that prevents a direct flow of air into the combustion chamber 53 and minimizes the potential for a wind gust to extinguish the flame at the burner tube 54.

As also shown particularly in FIG. 5 the upper plate 76 contains a pattern of spaced perforations 84. The lower plate 77 contains a pattern of perforations 85 that are offset with respect to the pattern in the upper plate 76. Most liquids from food strike the upper plate 76 and vaporize. To the extent liquid accumulates sufficiently to drop through an aperture 84 or drops directly from the food or grill 40 through an aperture 84, that liquid strikes a solid portion of the lower plate 77 to accumulate or be vaporized from or on the plate 77. Consequently this structure allows heated air to pass readily through the perforations 85 and 84 without any significant impediment to heating the food on the grill 40.

Figure 7:
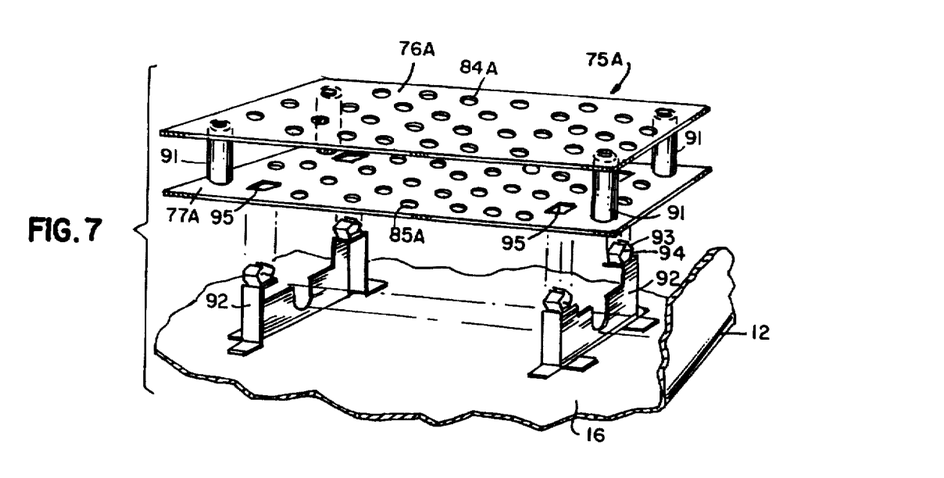
FIG. 7 is a detailed view of a portion of a barbecue illustrating an alternative embodiment of a smoker plate assembly with a pattern of spaced perforations.

FIG. 7 depicts an alternative smoker plate assembly 75A for positioning upper and lower smoker plates 76A and 77A that are essentially flat plates without any structure corresponding to the end portions 80 and 82 shown in FIG. 5. Standoffs 91 at different locations, typically adjacent each of the four corners of the plates 76A and 77A, provide the spacing between the plates 76A and 77A. Thus, in this particular embodiment the smoker plates 76A and 77A constitute an integral smoker plate assembly 75A. Vertical standoffs 92 that parallel side wall 12 and mount to the floor 16 position the integral assembly 75A with respect to the floor 16. Pentagon-shaped springs clip 93 constitute a releasable connection that holds the smoker plate assembly 75A on the standoffs 92. Each clip 93 has one side fastened, by riveting, bolting or otherwise, to a top edge 94 of the standoff 92. A similar clip would be located adjacent each of the corners to align with areas just inside the corners of the smoker plate assembly 75A. The bottom smoker plate 77 has apertures 94 positioned to align with the clips 93. As the smoker plate assembly 75A is positioned over the clips 93 and lowered, the clips 93 lead into the apertures 95 and compress until the bottom plate 77A passes a mid point to rest on the top surface 94. The clip 93 then expands and provides a releasable connection that prevents any inadvertent motion of the smoker plate assembly 75A relative to the standoff 92. Such a standoff could also include a vertical plate that would provide the air baffle function of depending portions 86 and 87 shown in FIG. 5.

Figure 8:
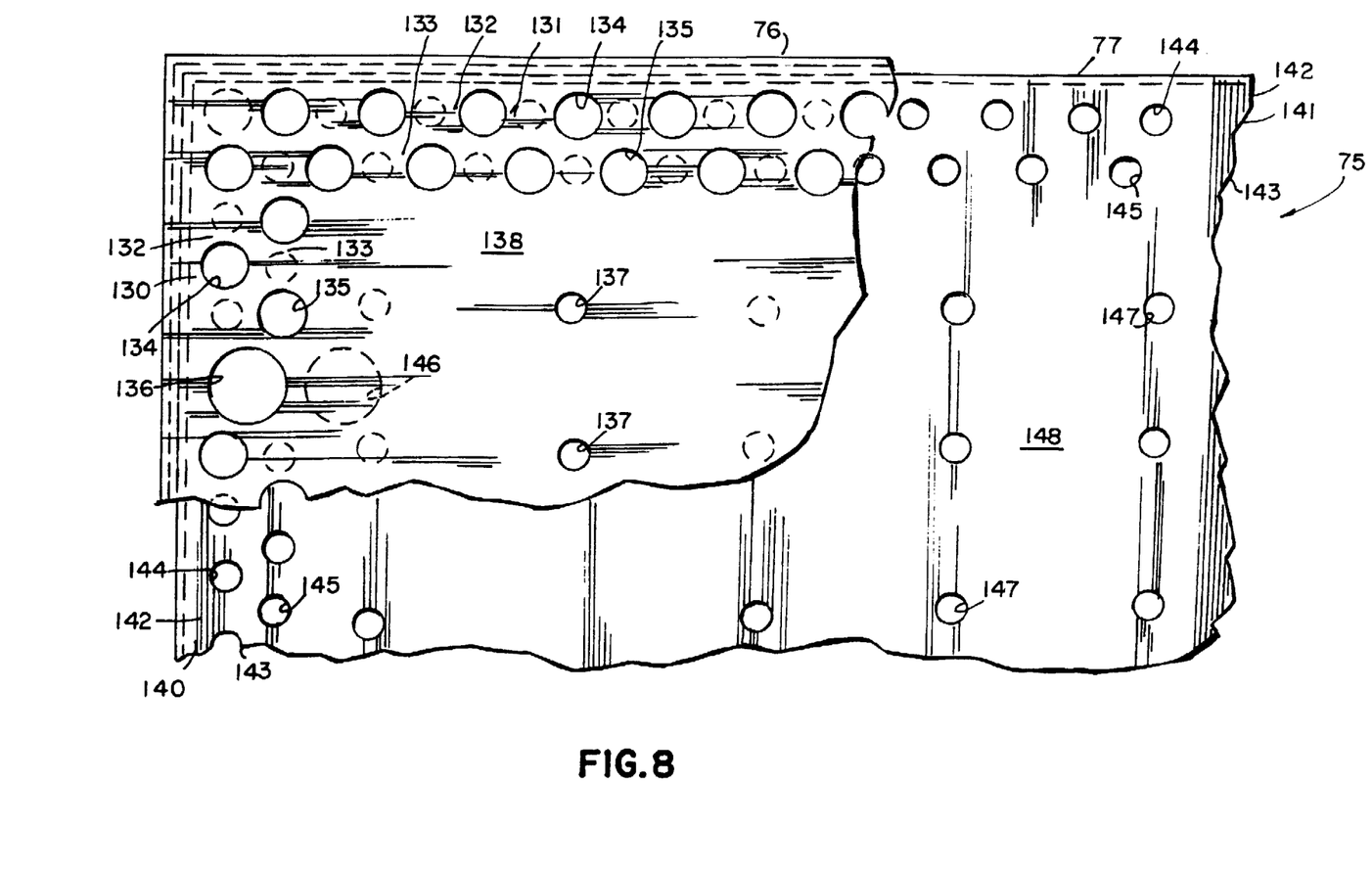
FIG. 8 is a top plan view that depicts a preferred pattern of perforations that can be used with the smoker plate assemblies of FIGS. 5 or 7.

FIG. 8 depicts a preferred pattern of perforations for a smoker plate assembly, such as the smoker plate assembly 75 in FIG. 5. In this embodiment the upper plate 76 contains side borders 130 and front and back borders 131 formed of two or more rows of 132 and 133 of laterally offset perforations 134 and 135 respectively. A larger perforation 136 is formed on opposite side borders 130 to serve as a finger hole that facilitates the removal of the upper plate 76 from the barbecue. Separate, widely spaced perforations 137 populate a central portion 138 of the upper plate 76 inside the borders 130 and 131.

The lower plate 77 has a similar pattern of side borders 140 and front and back borders 141 formed of two or more rows 142 and 143 of offset perforations 144 and 145 respectively. A larger perforation 146 in each of the side borders 140 serves as a finger hole. Separate, more widely spaced perforations 147 populate the lower plate 77.

Two rules govern the location, size and spacing of each of the perforations in this embodiment. First, liquids from food striking a plate must intercept a perforation in the border sections if they travel toward the edge of the plate. Thus the size and spacing of the perforations in each border section should intercept any straight-line path from the center sections 135 or 145 past any of the borders 130, 131, 140, 141. Second, there should be no direct path through and normal to the plates 76 and 77. This is accomplished by offsetting the perforations in the plates 76 and 77 from one another vertically. Thus, for example, the perforations 137 do not align over the perforations 147.

In any of the foregoing smoker plate assemblies, the offset nature of the patterns of perforations in the plates 76 and 77 or 76A and 77A minimizes the transfer of liquids into the combustion chamber 53. Consequently periodic cleaning of the smoker plate assemblies 75 and 75A generally will maintain the overall cleanliness of the barbecue because the smoker plate assemblies 75 and 75A minimize the collection of fats and drippings in the combustion chamber 53, especially when a pattern of perforations is used as shown in FIG. 8.

Figure 9:
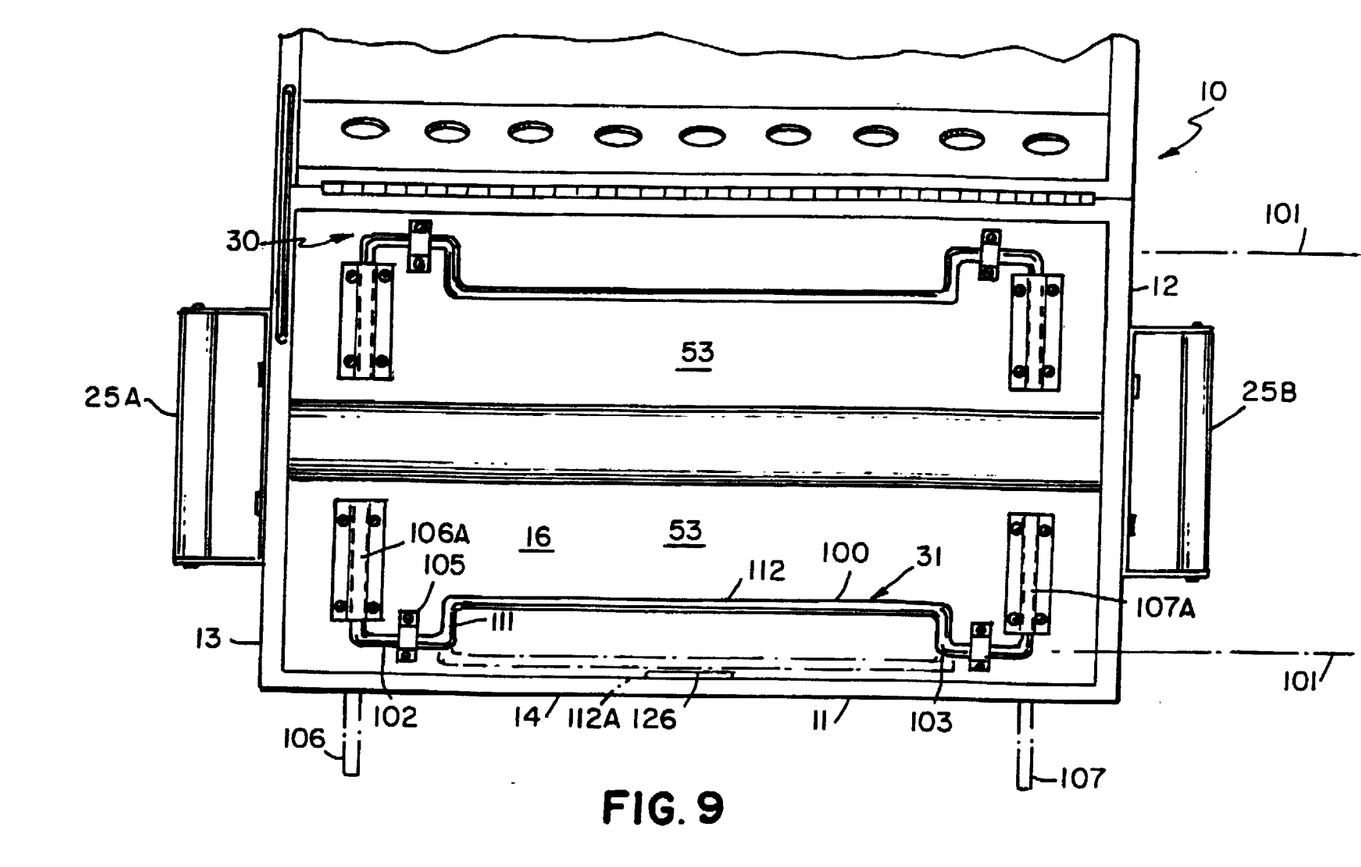
FIG. 9 is a top view of the base unit shown in FIG. 2.

In accordance with another aspect of this invention, the portable barbecue 10 includes, as shown in FIGS. 6 and 9, integral leg structures that shift between supporting and stowed positions. Each of the legs 30 and 31 is formed identically so the following discussion describes only the leg 31 in detail utilizing reference numeral 100 to denote the leg generically. Each leg 100 lies generally along a pivot axis 101 parallel to the bottom floor 16 and to the front wall 14 or rear wall 15 of the combustion chamber 53. Spaced portions 102 and 103 lie on an axis 101. Clamps 104 and 105 position the portions 102 and 103 respectively against the floor 16 such that the portions 102 and 103 can pivot about the axis 101. Leg sections 106 and 107 extend substantially at right angles to the portions 102 and 103 and the axis 101 and lie in a leg plane 110 shown in FIG. 10. Offsets 111 support a central portion 112 of the leg 100 between the spaced portions 102 and 103 and define a limit plane 113 also shown in FIG. 10.

Figure 10:
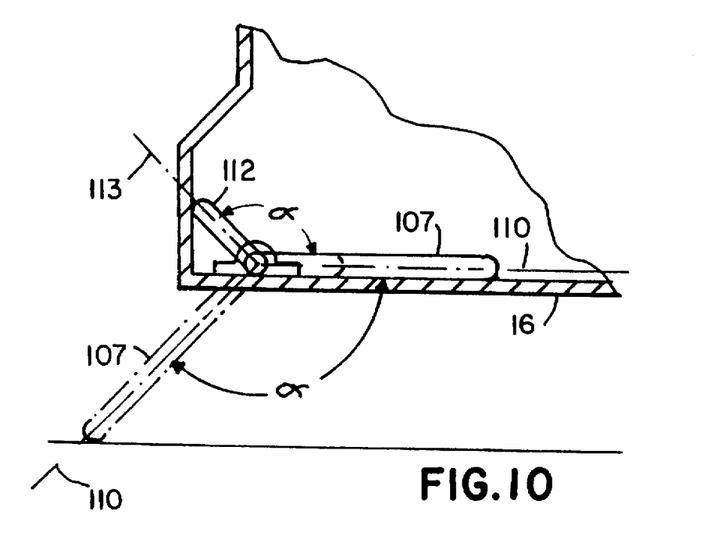
FIG. 10 is a diagram useful in understanding the operation of a leg structure shown in FIG. 9.

The leg plane 110 and limit plane 113 intersect at an angle α. The length of the offsets 111 and the angle α are selected to meet several criteria. First, the leg section 107 lies within the bottom 16 of the base 11 when the central section 112 abuts an adjacent portion of the front wall 14 or rear wall 15. Second, when the central portion 112 pivots to abut the inner surface of the bottom 16, the legs 107 splay outwardly such that the load on the legs transfers to the bottom 16 through the offsets 111 and central portion 112. Third, the relative dimensions establish a set of moments about the axis 101 that cause the legs 100 to move to an extended position as shown in FIG. 6 whenever they are free. This characteristic assures that the legs will set properly when the barbecue 10 is lowered to a support surface 32. In one particular embodiment, the leg portions 107 are 4 inches long, the offsets 111 are 1 inch and the axis 101 is spaced 1 inch from the inside surface of the wall 14. The angle α is 120°.

Figure 11:
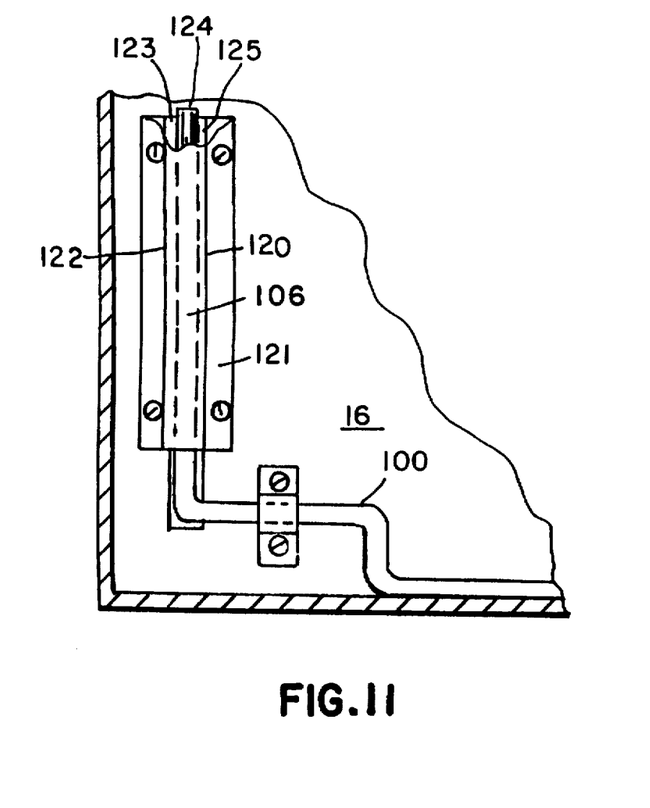
FIG. 11 is a detail showing the storage of a leg portion shown in FIG. 9.

Referring now to FIGS. 9 and 11, an elongated opening 120 (FIG. 11) in the bottom 16 receives a leg portion 107. In this particular embodiment, a cover 121 overlies the opening 120 thereby to prevent any material from transferring into or out of the combustion chamber 53. This cover 121 also forms a partially closed receptacle 122 for receiving the leg portion 106 shown in its extended position in FIG. 9 with the central portion 112 against the bottom 16. Reference 106A depicts the leg when it is positioned at the elongated opening 120 with the central portion moved to the front wall 14 as represented by 112A that references the central section against the front wall 14 as shown in phantom in FIG. 9 in a slot 123 such that the exterior surface of the bottom 16 is flush and smooth when the legs 100 are in their stowed position. Similar structures as shown in FIG. 11 are utilized for each of the leg sections. As an alternative, it is also possible to form the partially closed receptacle by metal stamping.

It is preferred that some structure positively retain the legs 100 in their stowed position during transport. In the stowed position, the central portion 112 abuts an inner surface of the proximate wall 14 or 15 and the leg portions are positioned within the bottom 16. In one particular embodiment a detent structure retains the leg portion 107 within the slot 123. Such a detent could comprise an end 124 of the leg 106 that slightly overlaps an edge 125 of the slot 123. The entire leg 100 being constructed of metallic rod will have sufficient flexibility to enable the end 124 to deflect sufficiently to pass by the edge 125. Alternatively a clip 126 (shown in FIG. 9) attached to the front wall 14 to capture the central portion 112 against the front wall 14.

Therefore in accordance with this invention, a barbecue 10, as shown in FIGS. 1 through 10 attains the various objects and advantages of this invention. More specifically, the connection shown particularly in FIGS. 3 through 5 facilitates the attachment and detachment of a pressurized gas bottle and regulator to the barbecue 10 thereby to facilitate its attachment in use and its stowage for transport.

The various embodiments of the smoker plate assembly shown in FIGS. 5 through 8 depict structures that improve the operation of a gas-fired barbecue by distributing the heat from the barbecue more evenly while preventing the accumulation of fluids from liquid from the food in a combustion chamber. The leg structures shown in FIGS. 9 through 11 provide supporting structures that are readily shifted between stowage and supporting positions and that, when released from the stowage position automatically assume a stable supporting position.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a barbecue having a base means for forming a combustion chamber with a floor portion and support means spanning the combustion chamber for supporting food in a support plane generally parallel to said combustion chamber floor, the improvement of plate means intermediate the combustion chamber and the support means distributing heat, said plate means comprising first and second perforated flat plates and plate support means extending substantially perpendicularly to said plates for supporting said plates in a spaced relationship parallel to the support plane and wherein said plate support means includes first and second upstanding legs mounted substantially perpendicularly to to said combustion chamber floor portion, releasable clip means on said leg means for engaging a first of said flat plates through certain of the perforations therethrough and means for supporting said second plate means relative to said first plate means, said perforations in one of said plates being offset from the perforations in the other of said plates whereby heated air flows from the combustion chamber through said perforations in said first and second plates to heat said plate means and food on said support means.

2. A barbecue as recited in claim 1 wherein said barbecue is gas-fired by gaseous fuel from a pressurized supply, wherein said base means includes burner tube means having a plurality of gas ports formed therein for producing a flame from the gaseous fuel in the combustion chamber and wherein first and second spaced end wall means support said burner tube means parallel to and spaced from said combustion chamber floor and said plate means, said first wall means including means for supporting the pressurized supply in an operable relationship with respect to said burner means.

3. A barbecue as recited in claim 2 wherein said second end wall has an aperture therethrough proximate said burner tube means for enabling ignition of gas discharging from said burner tube means.

4. A barbecue as recited in claim 1 additionally comprising first and second support means for engaging a surface to support said base means above such surface, each of said support means including a first section pivoted internally of said base means, end sections extending transversely with respect to said first section and to an exterior of said base means through corresponding passages in said base means, and means for limiting the motion of said first section thereby to define storage and stable support positions for said first and second support means.

5. A barbecue as recited in claim 4 wherein said base means includes third and fourth walls extending between the ends of said first and second walls and means for attaching said first section of each of said first and second support means for pivotal motion about a support axis parallel to and proximate said third and fourth walls, respectively and wherein said base means includes receptacle means formed in said combustion chamber floor extending parallel to said first and second walls from each of the passages in said base means whereby each of said end sections lie in a corresponding one of said receptacle means when each of said support means is in its storage position.

6. A barbecue as recited in claim 5 wherein said limiting means includes means for releasably engaging said first sections of said first and second support means thereby to retain said end sections in said receptacle means.

7. A barbecue as recited in claim 5 wherein said first section of each of said first and second support means includes a central offset section that rotates with said first section.

8. In a barbecue having a base means including a floor and walls for forming a combustion chamber, the improvement of first and second support means for engaging a surface to support said base means above such surface, each of said support means including a first section pivoted internally of said base means, end sections extending transversely with respect to said first section and to an exterior of said base means through corresponding passages in said base means, and means for limiting the motion of said first section thereby to define storage and stable support positions for said first and second support means.

9. A barbecue as recited in claim 8 wherein said base means includes third and fourth walls extending between the ends of said first and second walls and means for attaching said first section of each of said first and second support means for pivotal motion about a support axis parallel to and proximate said third and fourth walls, respectively and wherein said base means includes receptacle means formed in said combustion chamber floor extending parallel to said first and second walls from each of the passages in said base means whereby each of said end sections lie in a corresponding one of said receptacle means when each of said support means is in its storage position.

10. A barbecue as recited in claim 9 wherein said limiting means includes means for releasably engaging said first sections of said first and second support means thereby to retain said end sections in said receptacle means.

11. A barbecue as recited in claim 9 wherein said first section of each of said first and second support means includes a central offset section that rotates with said first section.

12. A barbecue as recited in claim 9 additionally comprising support means spanning said base means for supporting food in a support plane generally parallel to said combustion chamber floor and spaced perforated plate means parallel the support plane for distributing heat intermediate the combustion chamber floor and said support means whereby heated air flows from the combustion chamber through said perforations to heat said plate means and food on said support means.

13. A barbecue as recited in claim 12 additionally comprising plate support means extending substantially perpendicularly to said plate means for positioning said plate means relative to said combustion floor.

14. A barbecue as recited in claim 13 wherein said plate means includes first and second perforated plates and wherein said plate support means includes first and second upstanding legs mounted to said combustion chamber floor, releasable clip means on said leg means for engaging said first plate through certain of the perforations therethrough and means for supporting said second plate relative to said first plate.

15. A barbecue as recited in claim 10 using fuel from a pressurized supply and wherein said base means includes burner tube means having a plurality of gas ports formed therein for producing a flame from the gaseous fuel in the combustion chamber and wherein first and second spaced end wall means support said burner tube means parallel to and spaced from said combustion chamber floor and said plate means, said first wall means including means for supporting the pressurized supply in an operable relationship with respect to said burner means.

16. A barbecue as recited in claim 15 wherein said second end wall has an aperture therethrough proximate said burner tube means for enabling ignition of gas discharging from said burner tube means.

\* \* \* \* \*